(12) United States Patent
Mimoun

(10) Patent No.: US 12,510,673 B2
(45) Date of Patent: Dec. 30, 2025

(54) METHOD FOR ANALYZING A GLAZING FOR A LiDAR

(71) Applicant: SAINT-GOBAIN GLASS FRANCE, Courbevoie (FR)

(72) Inventor: Emmanuel Mimoun, Boulogne-Billancourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 825 days.

(21) Appl. No.: 17/796,140

(22) PCT Filed: Jan. 26, 2021

(86) PCT No.: PCT/FR2021/050142
§ 371 (c)(1),
(2) Date: Jul. 28, 2022

(87) PCT Pub. No.: WO2021/152256
PCT Pub. Date: Aug. 5, 2021

(65) Prior Publication Data
US 2023/0120203 A1  Apr. 20, 2023

(30) Foreign Application Priority Data
Jan. 31, 2020  (FR) ...................................... 2000955

(51) Int. Cl.
*G01S 17/93* (2020.01)
*G01S 7/497* (2006.01)
*G01S 17/931* (2020.01)

(52) U.S. Cl.
CPC ............ *G01S 17/931* (2020.01); *G01S 7/497* (2013.01)

(58) Field of Classification Search
None
See application file for complete search history.

(56) References Cited

U.S. PATENT DOCUMENTS 6,132,882 A * 10/2000 Landin .................... B32B 27/08
428/436
11,454,724 B2 * 9/2022 Michaels ................ G01S 7/481
(Continued)

FOREIGN PATENT DOCUMENTS

DE  10 2017 003634 A1  10/2017
EP  2 518 529 A2  10/2012
(Continued)

OTHER PUBLICATIONS

International Search Report as issued in International Patent Application No. PCT/FR2021/050142, dated Apr. 15, 2021.

*Primary Examiner* — Hovhannes Baghdasaryan
(74) *Attorney, Agent, or Firm* — Pillsbury Winthrop Shaw Pittman LLP

(57) ABSTRACT

A method for analyzing a glazing for a correction intended to be used by a LiDAR configured to emit, according to a given angle of emission, light waves intended to pass through a vehicle glazing, includes for a plurality of points of the glazing: obtaining a horizontal local slope and a vertical local slope at the point; calculating a vertical angular offset and a horizontal angular offset based on a vertical component and on a horizontal component of the angle of emission of the light wave passing through the glazing at the point, of the vertical local slope and of the horizontal local slope at the point and of the inclination of the glazing; and establishing an angular correction map from calculated vertical angular offsets and horizontal angular offsets.

26 Claims, 6 Drawing Sheets

(56) References Cited

U.S. PATENT DOCUMENTS

2015/0185313 A1* 7/2015 Zhu .................... G02B 26/105
　　　　　　　　　　　　　　　　　　　　　　　359/200.7
2018/0313940 A1* 11/2018 Wu ........................ G01S 17/89

FOREIGN PATENT DOCUMENTS

| WO | WO 2004/025334 A2 | 3/2004 |
| WO | WO 2018/115090 A1 | 6/2018 |

* cited by examiner

[Fig. 1]
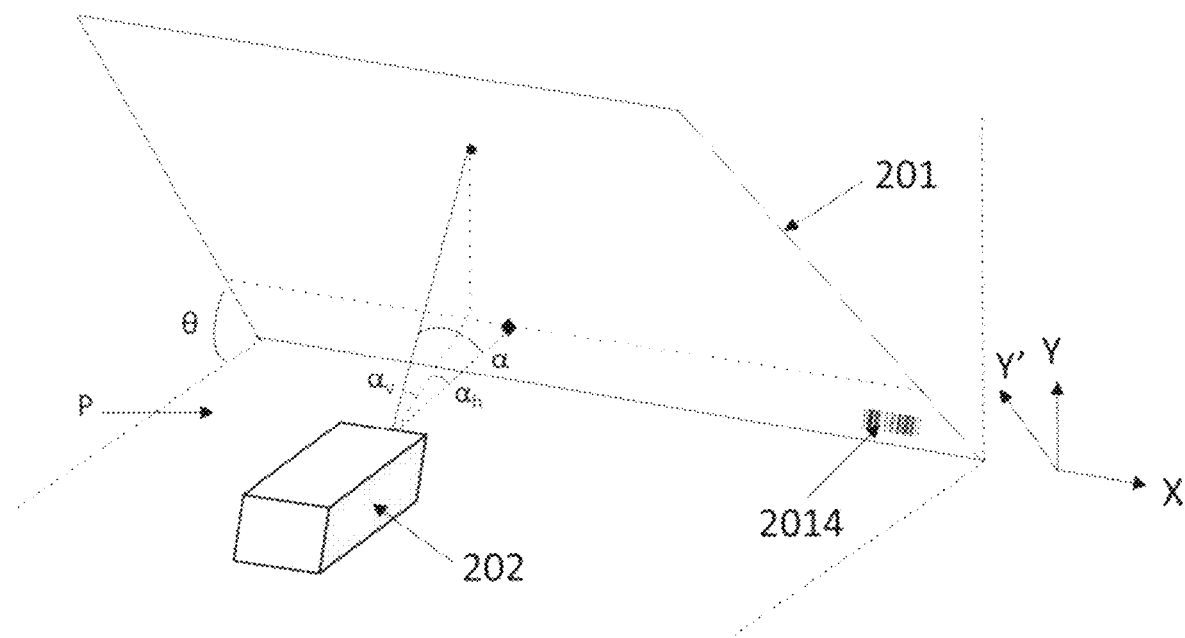
[Fig. 2]
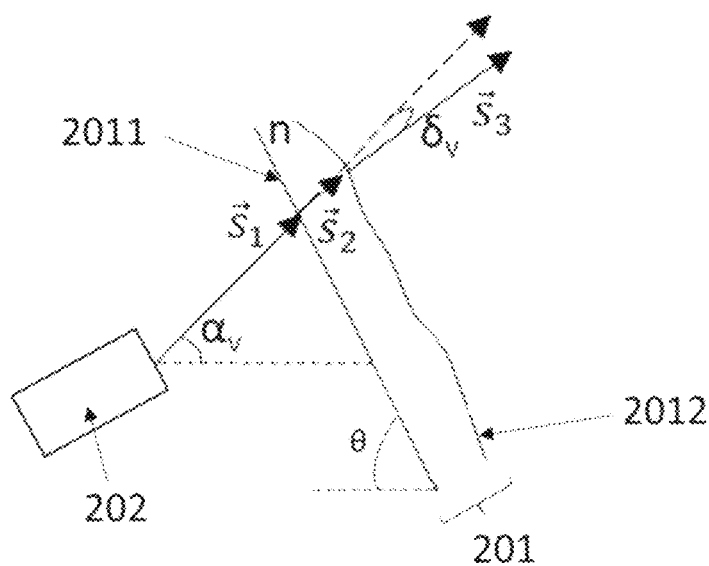

[Fig. 3]
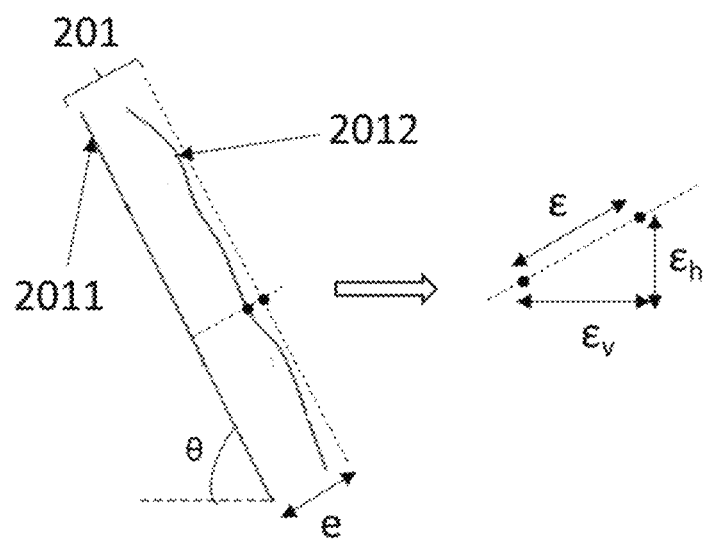
[Fig. 4]
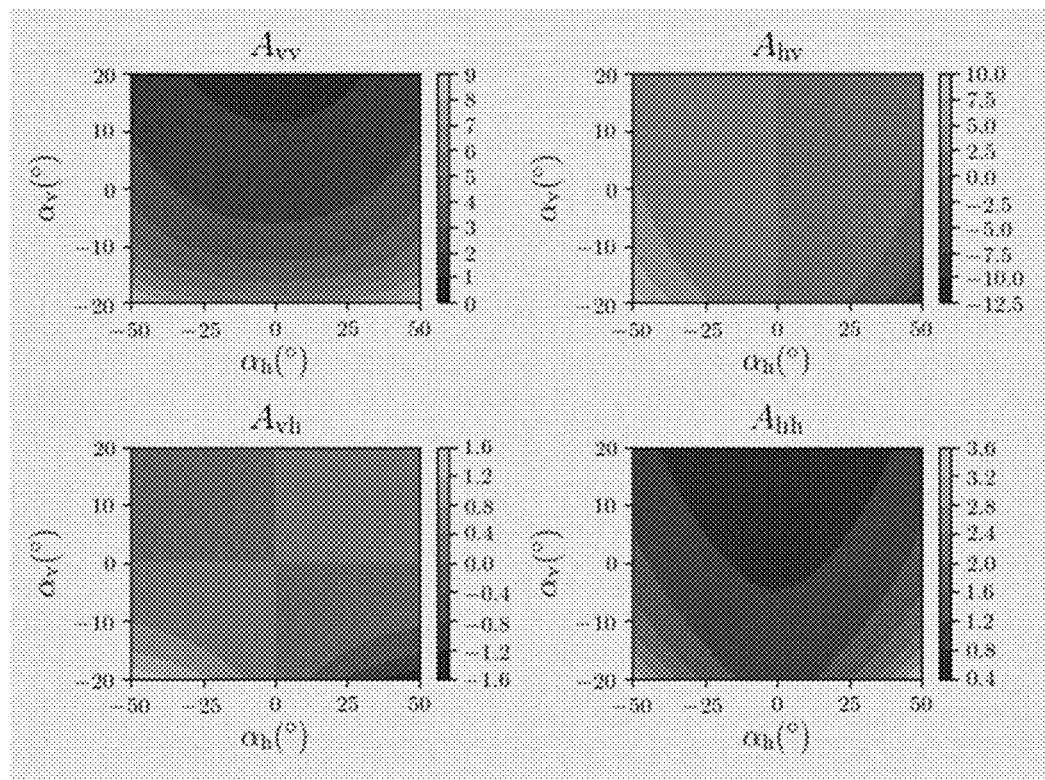

[Fig. 5]
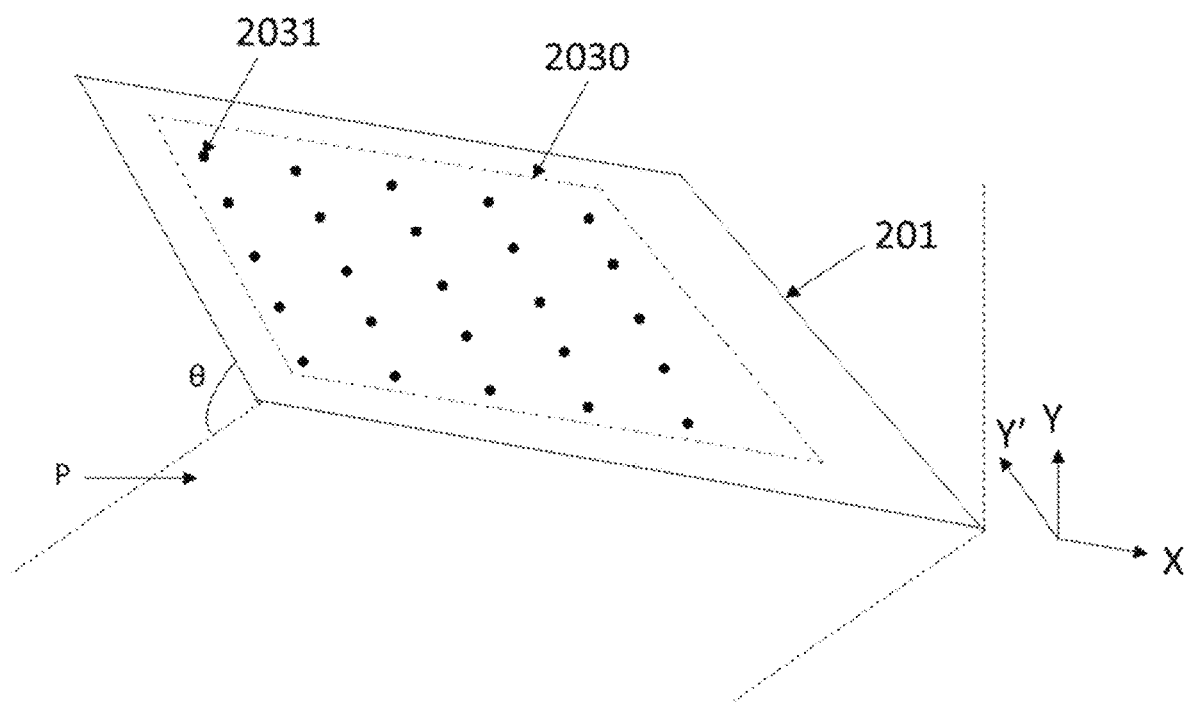

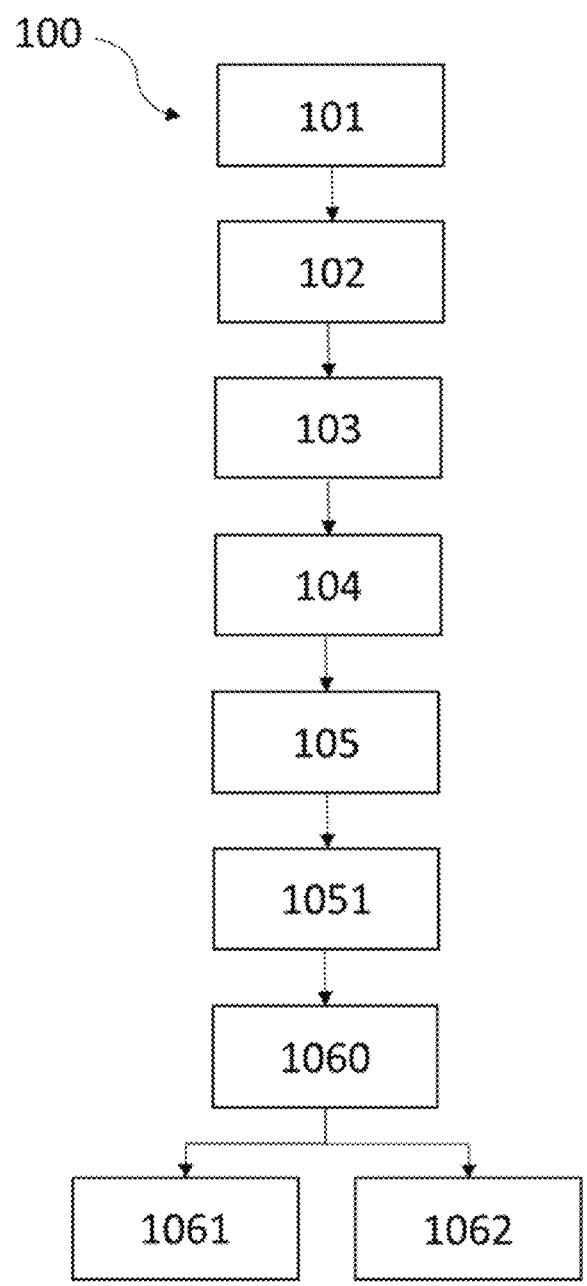
[Fig. 6]

[Fig. 7]
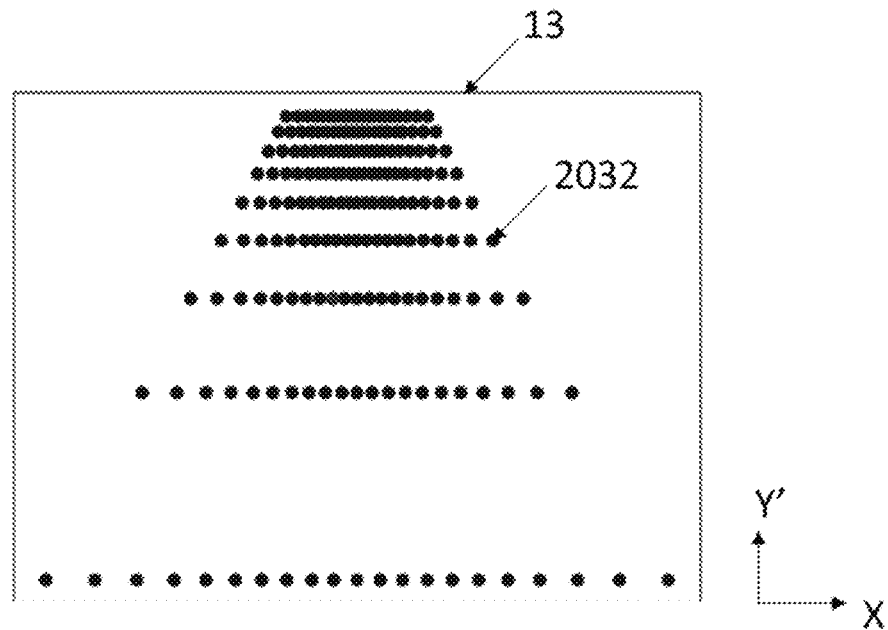
[Fig. 8]
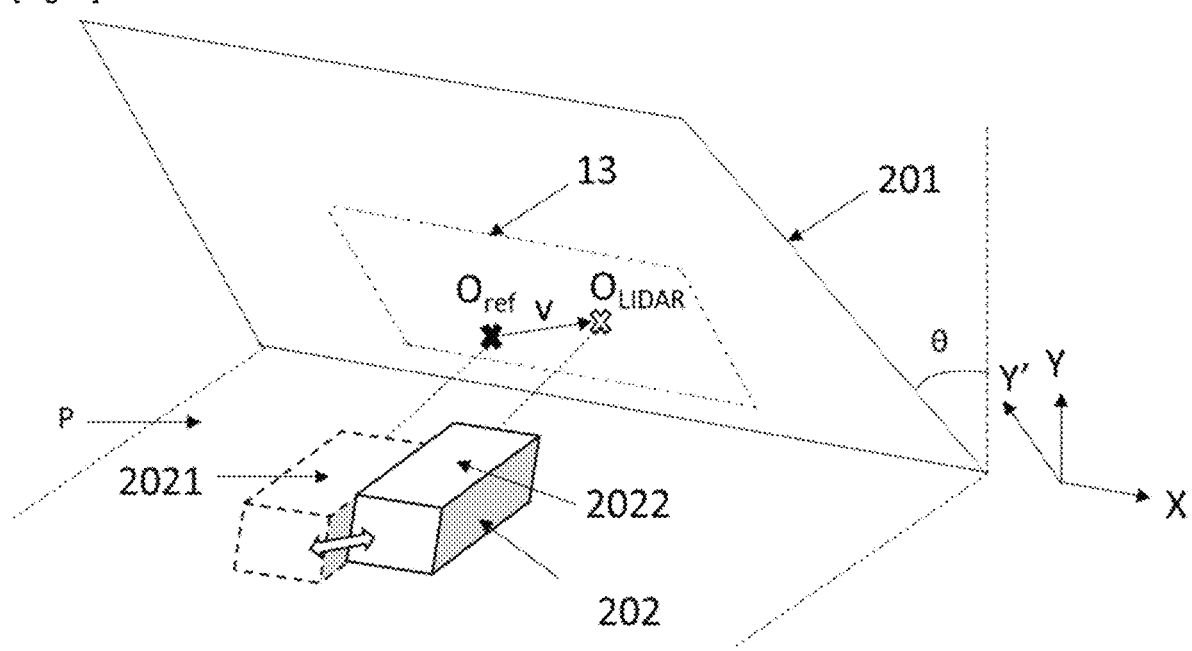

[Fig. 9]
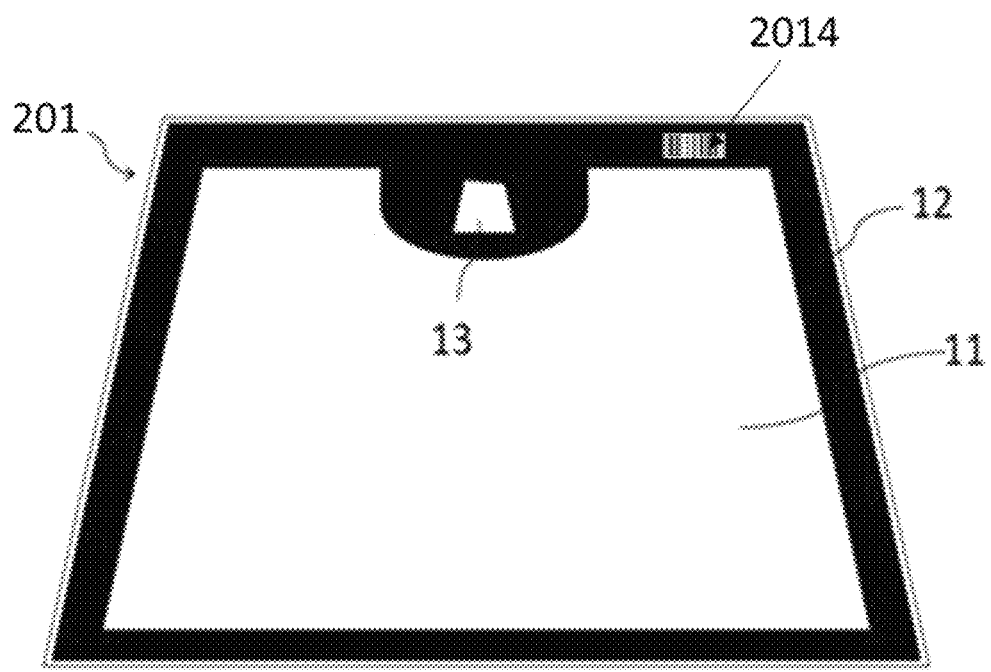

METHOD FOR ANALYZING A GLAZING FOR A LiDAR

CROSS-REFERENCE TO RELATED APPLICATIONS

This application is the U.S. National Stage of PCT/FR2021/050142, filed Jan. 26, 2021, which in turn claims priority to French patent application number 2000955 filed Jan. 31, 2020. The content of these applications are incorporated herein by reference in their entireties.

TECHNICAL FIELD OF THE INVENTION

The technical field of the invention is that of LiDARs, and more particularly of LiDARs emitting light waves through a vehicle glazing.

The present invention relates to a method for analyzing a glazing for a correction intended to be used by a LiDAR associated with the glazing and in particular a method for analyzing a glazing for a correction intended to be used by a LiDAR configured for emitting light rays through the glazing.

TECHNOLOGICAL BACKGROUND OF THE INVENTION

In the automobile industry, the use is known of a LiDAR (Light Detection And Ranging) as a system to aid in driving, and more particularly for detecting obstacles located in proximity to the vehicle and assessing the distance between the vehicle and each obstacle. For that purpose, the LiDAR is incorporated inside the vehicle, most often behind the windshield, as described in document WO2018115090.

To detect an object and assess the position of that object, a LiDAR emits a light wave toward the object and measures the round-trip propagation time of the light wave. However, it is known that the presence of a glazing in the path of the light wave causes errors from distortion in assessing the position of the object by the LiDAR.

Conventionally, these errors are corrected by calibrating the LiDAR already installed behind the glazing using calibration targets. In document DE102017003634, the LiDAR is calibrated using a fluorescent target enabling the points of intersection between the target and the light waves emitted by the LiDAR to be filmed.

However, such a solution adds a long and expensive step during quality control of the vehicle and uses dedicated equipment that is burdensome because of the required space, using special targets having geometric tolerances that must be verified.

There is therefore a need for correcting the position assessment errors produced by a LiDAR while remedying the aforementioned disadvantages.

SUMMARY OF THE INVENTION

The invention offers a solution to the aforementioned problems by making it possible to obtain an angular correction map for a LiDAR, while remedying the aforementioned disadvantages.

A first aspect of the invention relates to a method for analyzing a glazing of a vehicle for a correction intended to be used for a LiDAR configured to emit light waves, the glazing comprising an internal free surface toward the interior of the vehicle and an external free surface toward the exterior of the vehicle, each light wave being intended to pass through the glazing and being defined by a given point of impact on the internal free surface, the internal free surface defining a surface plane having a given inclination relative to a horizontal plane comprising an horizontal axis, the horizontal axis being perpendicular to a vertical axis and to a normal axis comprised in the surface plane, the method comprising the following steps:

for each point of a set of points of the glazing:
  determining a local thickness of the glazing at said point;
  obtaining by digital processing a horizontal local slope and a vertical local slope at said point, from the local thickness at said point;
  calculating a vertical angular offset based on a vertical component of an emission angle of the light wave intended to pass through the glazing at said point, on the vertical local slope at said point and on the inclination of the glazing;
  calculating a horizontal angular offset based on a horizontal component of an emission angle of the light wave intended to pass through the glazing at said point, on the horizontal local slope at said point and on the inclination of the glazing;
  establishing an angular correction map comprising, for each point of the set of points, the vertical angular offset and the horizontal angular offset calculated for said point.

By virtue of the invention, an angular correction map listing, for a plurality of points of the glazing, the angular offset caused by non-planarities of the glazing to a hypothetical light wave emitted by a LiDAR passing through the glazing, is calculated. This angular correction map can then be used by a LiDAR to correct its estimate of the position of an object, knowing the angle of emission and therefore the point of the glazing through which the light wave passes which is reflected on the object.

The method according to the invention enables a calibration of the LiDAR prior to its installation, since no light wave needs to be emitted by the LiDAR, which makes it possible to obtain angular corrections prior to the installation of the LiDAR. The method can therefore be implemented by the supplier of the glazing, which saves the end user of the vehicle from a long and costly calibration process. Moreover, the method uses no tools that would be uniquely dedicated to obtaining angular corrections, but only devices known for other applications.

In addition to the features just mentioned in the preceding paragraph, the method according to a first aspect of the invention can have one or more additional features among the following, considered individually or according to all of the technically possible combinations thereof.

According to the invention, the method advantageously further comprises a step of completion of the angular correction map by calculating the vertical angular offset and the horizontal angular offset of a plurality of points of the glazing not pertaining to the set of points, the calculation being carried out from horizontal local slopes and vertical local slopes obtained by interpolation from horizontal local slopes and vertical local slopes calculated for the set of points.

Thus, even if the points of impact of the light waves emitted by the LiDAR on the internal free surface do not coincide with the set of points, the angular correction map comprises an angular correction for each point of impact.

According to the invention, each point of the set of points is preferably spaced from one other point of the set of points by no more than 1 mm or preferably no more than 100 µm along the horizontal axis and/or no more than 100 nm or preferably no more than 10 nm along the normal axis. The spacing can be regular or not, more or less dense.

Preferably, the set of points is selected in such a way as to cover all the possible non-planarities of the glazing.

According to the invention, the set of points is preferably selected so as to cover a zone included in the glazing, having a dimension along the horizontal axis of at least 1 cm and a dimension along the normal axis of at least 1 cm.

Thus, the set of points is selected in such a way as to cover a zone suitable for the proper operation of the LiDAR.

In particular, the zone included in the glazing has a width at least centimetric and preferably no more than 25 cm or better, no more than 15 cm, and better still no more than 5 cm.

Thus, the dimension of the zone included in the glazing can correspond to the dimension of a hole in the glazing (hole in an internal glass of a laminated glazing as described subsequently, for example), for example of a dimension at least 80 or 90% of the dimension of the hole.

According to one embodiment, the step of determining the local thickness is carried out by a direct measurement of thickness or by differentiation of a first surface measurement carried out on the internal free surface of the glazing and of a second surface measurement carried out on the external free surface of the glazing.

According to one alternative of the preceding embodiment, the step of determining the local thickness is carried out by contactless optical measurement.

According to a variant of the preceding embodiment, the step of determining the local thickness is carried out by wavefront measurement, deflectometry or confocal profilometry.

According to one variant, the step of determining the local thickness is carried out by measuring optical transmission distortion.

Thus, the first step of the method is carried out by means of devices commonly used to make optical measurements that are usable in numerous fields, such as for example a wavefront analyzer.

According to the invention, the vertical angular offset and the horizontal angular offset are preferably calculated by the following formulas:

$$\begin{cases} \delta_v = A_{vv}\varepsilon_v + A_{hv}\varepsilon_h \\ \delta_h = A_{vh}\varepsilon_v + A_{hh}\varepsilon_h \end{cases}$$

With $A_{vv}$, $A_{hv}$, $A_{vh}$, $A_{hh}$, coefficients dependent on the vertical component and on the horizontal component of the angle of emission of the light wave intended to pass through the glazing at said point and on the inclination of the glazing.

Thus, the vertical angular offset and the horizontal angular offset are calculated sufficiently precisely to correct the assessments of positions of objects that are carried out by the LiDAR.

In particular, the formulas correspond to the first order approximations of the equation of refraction applied to the internal face of the glazing and of the equation of refraction applied to the external face of the glazing, written as follows:

$$\begin{cases} \vec{s_2} = -\frac{1}{n}\vec{N_1} \wedge \left(\vec{N_1} \wedge \vec{s_1}\right) - \sqrt{1 - \frac{1}{n^2}\left\|\vec{N_1} \wedge \vec{s_1}\right\|^2} \vec{N_1} \\ \vec{s_3} = -n\vec{N_2} \wedge \left(\vec{N_2} \wedge \vec{s_2}\right) - \sqrt{1 - n^2\left\|\vec{N_2} \wedge \vec{s_2}\right\|^2} \vec{N_2} \end{cases}$$

Where:

$\vec{N_1}$, the vector normal to the internal face of the glazing at said point;

$\vec{N_2}$, the vector normal to the external face of the glazing at said point;

$\vec{s_1}$, the direction of the light wave prior to passing through the glazing;

$\vec{s_2}$, the direction of the light wave after passing through the internal face of the glazing;

$\vec{s_3}$, the direction of the light wave after passing through the internal face then the external face of the glazing;

n, the refractive index of the glazing.

In particular, the coefficients $A_{vv}$, $A_{hv}$, $A_{vh}$, $A_{hh}$ are calculated by an analytical method particularly without having to resolve differential equations, for example using a matrix calculation tool such as NumPy or MATLAB.

According to the invention, the steps described previously (for calibrating the LiDAR) of determining the local thickness, obtaining horizontal and vertical local slopes, of calculating a vertical angular offset, of calculating a horizontal angular offset and of establishing an angular correction map and even the optional step of supplementing the angular correction map are carried out prior to the installation of the LiDAR by defining a theoretical reference point of impact associated with a reference angle of emission.

Once the LiDAR is calibrated, it is installed it is placed in operation (turned on) and the alignment is to be verified and if necessary recalibration is to be carried out.

According to the invention, the method preferably comprises a step of forming a referencing point on the internal free surface glazing in the form of a mark (or reference mark) corresponding to the theoretical reference point of impact.

Thus, a subsequent step of alignment is facilitated.

According to a first embodiment, if, after installation of the LiDAR, there is an offset between the referencing point and a real reference point of impact of a light wave emitted at the reference angle of emission by the LiDAR, the method comprises a step of alignment of the real reference point of impact and the referencing point.

Thus, the position of the LiDAR is adjusted in order to correspond to a position of reference in order not to introduce offsets in the map of corrections of angular errors. This step of possible alignment does not require additional complex tools or space, or even an intervention. It can be done automatically.

According to one embodiment, the alignment step is carried out via a mechanism of attaching the LiDAR onto the vehicle. The attachment is already referenced, therefore the alignment is instantaneous once the LiDAR is attached.

According to one variant of embodiment, if, after installation of the LiDAR, there is an offset between the referencing point and a real reference point of impact of a light wave emitted at the reference angle of emission by the LiDAR, the method comprises a step of recalibrating the angular correction map by applying a translation.

Thus, the angular correction map is adapted to the actual position of the LiDAR in order not to have to modify the positioning of the LiDAR.

In particular, the translation has a value equal to the difference between the position of the referencing point and the position of the reference point of impact on the internal free surface of the glazing.

According to the invention, for a light wave having a given angle of emission, the component x along the horizontal axis and the component y' along the normal axis of the position on the glazing of a point of the glazing through which the light wave passed are calculated by the following formulas:

$$\begin{cases} x = \dfrac{\cos\theta \tan\alpha_h}{\sin\theta \tan\alpha_v + \cos\theta} \\ y' = \dfrac{\sin\alpha_v}{\cos(\theta - \alpha_v)} \end{cases}$$

A second aspect of the invention relates to a vehicle glazing capable of allowing light waves to pass that are emitted by a LiDAR, particularly (closest to) infrared, the glazing comprising a storage means configured to store an angular correction map established via the method according to the first aspect of the invention for the glazing.

According to an alternate embodiment, the storage means is a datamatrix or a barcode that links to a database. For example, the storage means is for example in the form of a datamatrix. The storage means can also be in the form of a barcode, for example a flash code, a TAGs, a QR code which links to a database. Naturally, the storage means can be in another form, such as a hard disk, a storage server or an electronic memory.

Preferably, the storage means is on the glazing. This can be a deposit, a film (glued).

The storage means (for example a layer) can in particular be printed on the glazing 201. The printing is for example carried out by etching and/or by inkjet printing.

Thus, this makes it possible to supply the LiDAR with a proper angular correction map.

In particular, the storage means is transparent or visible under certain conditions, and/or the glazing comprises a zone covered by an opaque element and the storage means is in a masking produced in the zone covered by the opaque element (particularly at the periphery, such as an enamel masking strip or other opaque means, particularly black).

Thus, the storage means is discrete.

According to the invention, the glazing is for example a laminated glazing comprising an external glass, a lamination interlayer and an internal glass.

Thus, light transmission and security is improved.

In particular, the laminated glazing comprises at least one through-hole in the internal glass, even a hole in the lamination interlayer.

Thus, the hole makes it possible to efficiently and selectively transmit and/or collect the set of light waves passing through the glazing.

A third aspect of the invention relates to a system comprising a glazing according to the second aspect of the invention and a LiDAR configured to emit light waves passing through the glazing.

According to an alternate embodiment, the glazing comprises a referencing point in the form of a marking.

Thus, it is easier to adjust the position of the LiDAR during its installation or during the alignment step.

A fourth aspect of the invention relates to a vehicle comprising a glazing according to the second aspect of the invention or a system according to the third aspect of the invention.

According to an alternate embodiment, the glazing is a windshield.

The invention and its various applications will be better understood from reading the following description and examining the accompanying figures.

BRIEF DESCRIPTION OF THE FIGURES

The figures are provided for information purposes and are in no way limiting of the invention.

FIG. 1 shows a schematic representation of a LiDAR emitting a light wave passing through a vehicle glazing.

FIG. 2 shows a schematic representation of a vehicle glazing viewed in cross-section.

FIG. 3 shows a schematic representation viewed in cross-section of the path of a light wave emitted by a LiDAR through a vehicle glazing.

FIG. 4 gives the value of coefficients $A_{vv}$, $A_{hv}$, $A_{vh}$, $A_{hh}$ based on the vertical component of the angle of emission of a light wave and on the horizontal component of the angle of emission of the light wave for a glazing inclined at 30° relative to a horizontal axis.

FIG. 5 shows a schematic representation of a set of points of a vehicle glazing for which angular corrections have been calculated by the method according to the first aspect of the invention.

FIG. 6 is a block diagram showing the sequence of steps of a method according to the first aspect of the invention FIG. 7 shows an example of points of impact of light waves emitted by a LiDAR on an internal free surface of a glazing.

FIG. 8 shows a schematic representation of a step of alignment of a method according to the first aspect of the invention.

FIG. 9 shows a schematic representation of a front view of a glazing.

DETAILED DESCRIPTION

Unless stated otherwise, one and the same element appearing in different figures has a unique reference.

A first aspect of the invention relates to a method of determining angular corrections that are intended to be used by a LiDAR.

LiDAR is understood as being a device making it possible to assess the position of an object by emitting a light wave toward the object and by measuring the round-trip propagation time of the light wave reflected from the object.

Each light wave is emitted by the LiDAR at a wavelength preferably falling within the near-infrared range and in particular in a range from 800 nm to 1800 nm, particularly 905±5 nm and/or 1550±5 nm and/or even 850±5 nm. Preferably, the transmission factor at said wavelength(s) (of the LiDAR) is at least 70% or 80%.

The LiDAR is intended to be installed in the interior of a vehicle in such a way that the light waves emitted by the LiDAR pass through a glazing of the vehicle before being reflected by the objects for which it is desired to estimate the position by means of the LiDAR. In other words, the LiDAR and the object the position of which is to be assessed by the LiDAR are located on either side of the vehicle glazing.

Glazing is understood as being a panel formed from a transparent material such as glass or plastic. The panel forming the glazing can comprise a single sheet of transparent material or a plurality of sheets of transparent material; this is referred to as laminated glazing.

The glazing is for example a laminated vehicle glazing (and preferably curved), particularly for a road vehicle (car, truck, public transport: bus, car, etc.) or railway (particularly at maximum speed of no more than 90 km/h or no more than 70 km/h, particularly metros, tramways), in particular a windshield, or a rear window, perhaps a side glazing, of a given thickness E1, for example sub-centimetric, particularly no more than 5 mm for a road vehicle windshield, particularly for a car.

The glazing comprises:
  a first glass sheet, particularly curved, intended to be the external glazing, with a first external main face F1 and a second internal main face F2 (oriented toward the passenger compartment). If the vehicle is an automobile, its thickness is preferably no more than 4 mm, and even no more than 3 mm or 2.5 mm, particularly 2.1 mm, 1.9 mm, 1.8 mm, 1.6 mm and 1.4 mm, and preferably at least 0.7 mm or 1 mm;
  a lamination interlayer (single or multi-layer), optionally neutral, clear, extra clear or tinted particularly gray or green, of a polymer material, preferably thermoplastic and more preferably still polyvinyl butyral (PVB). If the vehicle is a road vehicle, its thickness E3 is no more than 1.8 mm, preferably no more than 1.2 mm and even no more than 0.9 mm (and preferably at least 0.3 mm and even at least 0.6 mm). The lamination interlayer is optionally acoustic and/or optionally having a transverse cross-section decreasing in shape from the upper corner to the bottom of the laminated glazing (particularly a windshield) particularly for a head-up display (HUD). The lamination interlayer has a main face FA oriented toward F2 and a main face FB opposite FA;
  a second glass or plastic sheet intended to be the internal glazing, preferably curved and in particular tinted, with a third main face F3 beside F2 and a fourth internal main face F4 (oriented toward the passenger compartment). If the vehicle is a road vehicle, its thickness E2 is preferably less than that of the first sheet, even no more than 3 mm or 2 mm—particularly 1.9 mm, 1.8 mm, 1.6 mm and 1.4 mm—or even no more than 1.3 mm, and preferably at least 0.7 mm, the thickness of the first and second sheets preferably being strictly less than 5 or 4 mm, even than 3.7 mm.

For example, the first sheet has a total iron oxide content by weight of no more than 0.05%.

In particular, the second sheet is capable of absorbing (significantly) in the near-infrared for example the second sheet is glass and has a total iron oxide content by weight of at least 0.4%.

Also, the second sheet has a through-hole in the thickness, particularly of a width W1 at least centimetric and preferably no more than 25 cm or preferably no more than 15 cm, even more preferably no more than 5 cm for better mechanical strength, particularly of trapezoidal or rectangular or circular cross-section.

Optionally, the lamination interlayer (colorless, etc.) has a partial hole or through-hole in the thickness, preferably at least extending the hole through the second sheet, optionally wider particularly no more than 10 mm or narrower no more than 3 mm or 1 mm, particularly of trapezoidal, or rectangular or circular, etc. cross section (particularly of the same shape as and even homothetic to the section of the hole passing through the glass).

The shape and dimensions of the through-hole are configured according to the techniques of the art so as to transmit and efficiently and selectively collect all the rays passing through the glazing.

For example the hole is of the same shape as the LiDAR.

The hole (open or closed) can be in particular of convex cross-section especially preferably trapezoidal, or circular or oval or ellipsoid or even rectangular, square.

The hole particularly has a dimension defined by the field of view of the LiDAR based on its positioning.

The hole passing through the second sheet can be free or wholly or partially occupied for example by a fill material transparent to the working wavelength, and/or occupied by an insertion of a part of the LiDAR.

The through-hole can be:
  closed (surrounded by the wall of the second sheet), therefore within the glazing particularly spaced from the closest edge face of the glazing by at least 3 cm or 5 cm,
  open or opening, forming a notch (peripheral).

The glazing can comprise a total through-hole consisting:
  of a hole passing into the lamination interlayer (single or multi-laminations) of width D1;
  and of said hole passing into the second sheet of width W1.

The first and second holes are of coincident or nearly coincident axis of symmetry and preferably of identical width (before and/or after lamination).

The through hole is intended to be positioned in the optical path of the LiDAR.

The light transmission TL of the laminated glazing in a zone without hole (particularly central zone if windshield) is preferably at least 70% or 75%, 80% or 85%, 88%.

The through-hole of constant or variable cross-section, particularly trapezoidal or rectangular or disk or oval, is for example smaller (in diameter) by at least 2 cm, 3 cm, 5 cm and preferably of larger dimension of no more than 30 cm or 25 cm.

The glazing preferably comprises a peripheral opaque masking layer, particularly an opaque peripheral masking strip, particularly black.

The opaque masking layer is particularly in the form of at least one coating on one of the first and second sheets and/or on the lamination interlayer.

The zone is for example a rectangular strip along one edge of the glazing, particularly the longitudinal edge especially of a windshield. The strip is particularly a band beneath the full length of the edge and extended into the zone (particularly central) with said through-hole The masking layer can be on either side of the hole (closed) and even around the hole (closed).

Furthermore, the glazing can comprise a plate (opaque) glued to face F4 comprising a hole particularly to the right of said through-hole of the internal glazing (wider than or in the extension of said through-hole) if the internal glazing is holed, particularly a plastic plate optionally reinforced, opaque, with means capable of supporting or maintaining an infrared viewing system of a working wavelength such as a LiDAR.

In particular, a plate particularly of a sub-centimetric thickness, particularly 1 to 3 mm, and even 1.5 to 2.5 millimeters, can be glued onto the face F4. For example, it is optionally of reinforced plastic (fibers, etc.) for example polycarbonate (PC), methyl polymethacrylate (PMMA), polyethylene (PE), polypropylene (PP), polyamide (PA66), acrylonitrile butadiene styrene (ABS) and ABS-PC alloys thereof, polystyrene (PS), acrylonitrile styrene acrylate (ASA) based on formaldehyde polymer (polyoxymethylene POM), polybrominated terphenyl (PBT) preferably reinforced with glass fibers for even greater strength, particularly PA66 GF30 (30% glass fibers).

This plate can be used to support or contribute to supporting or stabilizing the LiDAR. This plate have a hole to the right of said through-hole.

This plate (with or without hole) can also be used in a glazing (laminated) without hole.

Like said through-hole, this plate is preferably peripheral particularly at the upper border of the glazing. For example, it is in a central zone, the zone (conventional) of the rearview mirror (present or absent).

If the hole is closed, the edge of the hole closest to the edge face of the glazing (preferably upper longitudinal edge and particularly in the central zone) is spaced from this edge face of the glazing (of the second sheet) by at least 2 cm or 3 cm and preferably 5 cm.

The through-hole can be in the central zone of the upper longitudinal edge of the windshield, the usual zone of the internal rearview mirror (adjacent to the hole or rearview mirror eliminated depending on the vehicle), zone where the masking layer on face F2 and/or FA is generally thicker than on the lateral zones along the upper edge (passenger, driver).

Preferably, the through-hole has a particularly trapezoidal or circular or oval cross-section:
- of smaller dimension of at least 2, 3, 5, 8 cm (adapted to the dimension of the infrared vision system, for example)—and preferably of larger dimension (particularly large side or diameter) of no more than 40 cm, 30 cm, 20 cm (for mechanical aspects);
- and preferably an antireflective coating occupies a surface encompassing the hole and of a length of no more than 30 cm.

In particular, the cross-section of the through-hole is a quadrangle, particularly a rectangle or trapezoid, with
- a first (large) side or longitudinal edge called upper (the closest to the section of the upper longitudinal edge of the glazing) preferably parallel to the section of the upper longitudinal edge of the glazing and of a length preferably no more than 30 cm, 20 cm or 15 cm or 12 cm and particularly spaced at least 5 cm or 6 cm from the edge face;
- a second (large) side or longitudinal edge called lower (the farthest from the section of the upper longitudinal edge of the glazing, closest to the central zone) preferably parallel to the section of the upper longitudinal edge of the glazing and of a length preferably no more than 35 cm or 30 cm or 25 cm or 20 cm and preferably larger than that of the first large side;
- of a height (between these large sides) of preferably at least 5 cm and preferably no more than 15 cm.

If the hole is small, no more than 10, 8, 5, 2 cm, it is preferred to make the hole circular.

The through-hole is along a longitudinal edge or alternatively the through-hole is along a lateral edge.

In the case of a rear window, the through-hole can be peripheral along a longitudinal edge (particularly upper) or lateral edge.

The through-hole has a given shape particularly of convex right cross-section, for example trapezoidal or rectangular or round or oval. The antireflective coating can have a homothetic shape.

Of course, the interlayer can comprise several laminations of thermoplastic material of different natures, for example of different hardnesses to provide an acoustic function, as described for example in publication U.S. Pat. No. 6,132,882, particularly a set of PVB laminations of different hardnesses. Similarly, one of the glass laminations can be thin compared to the thicknesses conventionally used.

According to the invention, the interlayer can have a wedge-shape, particularly in view of an HUD (Head Up Display) application. One of the laminations of the interlayer can also be tinted in the mass.

As a common lamination interlayer, other than PVB, a flexible polyurethane PU can be mentioned, a thermoplastic without plasticizer such as ethylene-vinyl acetate copolymer (EVA), an ionomer resin. These plastics have for example a thickness of between 0.2 mm and 1.1 mm, particularly 0.3 and 0.7 mm.

The lamination interlayer can comprise another functional plastic film (transparent, clear or tinted) for example a polyethylene terephthalate PET film supporter of a layer that is athermal, electroconductive, etc., for example a PVB/functional film/PVB between faces F2 and F3.

At least one of the first and second sheets (preferably the exterior glass) can be tinted, and the laminated glazing can also comprise a layer which reflects or absorbs solar radiation, preferably on face F4 or on face F2 or F3, in particular a transparent electrically conductive oxide layer, called "TCO layer", (on face F4) or even a stack of thin layers comprising at least one TCO layer, or stacks of thin layers comprising at least one silver layer (on F2 or F3), the or each silver layer being positioned between dielectric layers.

The layer (silver) on face F2 and/or F3 and TCO layer on face F4 can be combined.

The TCO layer (of a transparent electrically conductive oxide) is preferably a layer of fluorine-doped tin oxide ($SnO_2$:F) or a layer of mixed indium tin oxide (ITO).

The layer reflecting or absorbing solar radiation is preferably absent in the zone for the LiDAR, therefore absent facing said through-hole in the case of a glazing with hole.

The glazing can therefore include on face F2 a functional coating that is an athermal functional layer, particularly electroconductive, optionally heating, in particular a silver stack, if necessary absent in the zone for the LiDAR particularly of said through-hole at least in the central zone and at the edge of the through-hole between the face F2 and Fa.

The interlayer (or any other polymer film) can include metal wires particularly heating (face FB, face FA, etc.) particularly anchored on the surface and present or if necessary absent in the zone for the LiDAR in particular facing said through-hole of the second glass sheet (if holed).

The heating wires in particular have a thickness less than or equal to 0.1 mm preferably of copper, tungsten, gold, silver or aluminum or alloys of at least two of these metals.

In one embodiment, a heating zone of the glazing (optionally local, facing said through-hole of the second glass sheet) comprises a plurality of individual metal wires, called "heating metal wires" which connect busbars to each other. The heating current passes through these individual metal wires. The wires are advantageously very thin so as not to impair, or only very slightly impair, the transparency of the glazing. Preferably, the metal wires have a thickness of less than or equal to 0.1 mm, in particular between 0.02 and 0.04 mm and ideally between 0.024 mm and 0.029 mm. The metal wires preferably contain copper, tungsten, gold, silver or aluminum or an alloy of at least two of these metals. The alloy can also contain molybdenum, rhenium, osmium, iridium, palladium or platinum. The metal wires are preferably electrically insulated.

For the glass of the first glass sheet and/or of the second glass sheet, preferably a soda-lime-silica type glass is used.

The first glass sheet (external glass) particularly silica-based, soda-lime-based, silica-soda-lime-based (preferably), or aluminosilicate-based, or borosilicate-based, has a total content by weight of iron oxide (expressed in the form $Fe_2O_3$) of no more than 0.05% (500 ppm), preferably no more than 0.03% (300 ppm) and no more than 0.015% (150 ppm) and in particular greater than or equal to 0.005%.

The second glass sheet (internal glass, particularly holed) particularly silica-based, soda lime-based, preferably soda-lime-silica-based (and like the first glass sheet), even aluminosilicate, or borosilicate-based has a total content by weight of iron oxide (expressed in the form $Fe_2O_3$) of at least 0.4% and preferably no more than 1.5%.

In one configuration, the first sheet is of mineral glass and the second sheet is of plastic for example thinner (film) etc., for example of PC, PMMA, PET.

The second glass or plastic sheet is particularly green, blue, gray. The second glass sheet can be green by the $Fe_2O_3$ or blue with CoO and Se or gray with Se and CoO.

The applicant's glasses can be mentioned in particular, called TSAnx (0.5 to 0.6% iron) TSA2+, TSA3+(0.8 to 0.9% iron), TSA4+(1% iron), TSA5+, for example green.

The TSA3+(2.1 mm) for example has a total transmission at 905 mm of about 40% and at 1550 mm of about 50%

The second glass sheet, particularly holed, can have a redox, defined as being the ratio between the content by weight of FeO (ferrous iron) and the total content by weight of iron oxide (expressed in the form $Fe_2O_3$) between 0.22 and 0.35 or 0.30.

The second glass sheet, particularly holed, can have a chemical composition that includes the following constituents in a content varying within the limits by weight as defined hereinafter:
  $SiO_2$ 64-75%
  $Al_2O_3$ 0-5%
  $B_2O_3$ 0-5%,
  CaO 2-15%
  MgO 0-5%
  $Na_2O$ 9-18%
  $K_2O$ 0-5%
  $SO_3$ 0.1-0.35%
  $Fe_2O_3$ (total iron) at least 0.4% and even 0.4 to 1.5%,
  Optionally redox 0.22-0.3%
  And in particular less than 0.1% impurities.

The internal and/or external glass may have undergone a chemical or heat treatment of the hardening or annealing type or a tempering (in particular in order to obtain a better mechanical strength) or be semitempered.

The glass of the first glass sheet and/or of the second glass sheet is preferably of the float glass type, that is to say obtainable by a method consisting in pouring molten glass onto a bath of molten tin (called a "float" bath). The terms "atmosphere" and "tin" faces are understood to mean those faces that have been in contact with the atmosphere in the float bath and in contact with the molten tin respectively. The tin face contains a small surface amount of tin that has diffused into the structure of the glass.

Face F2 can be the "tin" face as well as the "atmosphere" face.

The first glass sheet can for example be a soda-lime-silica glass such as Saint-Gobain Glass's Diamant®, or Pilkington's Optiwhite®, or Schott's B270®, or AGC's Sunmax® or of other composition described in document WO04/025334. The Planiclear® glass from the Saint-Gobain Glass company can also be selected.

With ordinary natural raw materials, the total content by weight of iron oxide is of the order of 0.1% (1000 ppm).

The $Fe_2O_3$ content (total iron) of the first glass sheet is preferably less than 0.015%, even less than or equal to 0.012%, particularly 0.010%, in order to increase the near infrared transmission of the glass. The $Fe_2O_3$ content is preferably greater than or equal to 0.005%, particularly 0.008% so that the cost is not a disadvantage.

In order to further increase the infrared transmission of the first glass sheet, the ferrous iron content can be reduced in favor of the ferric iron, thus oxidizing the iron present in the glass. Thus, the desire is for glasses having the lowest possible redox, ideally zero or nearly 0. This number can vary between 0 and 0.9 of zero redoxes corresponding to a totally oxidized glass.

Glasses comprising low quantities of iron oxide, particularly less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide.

The redox of the first glass sheet is preferably greater than or equal to 0.15, and particularly between 0.2 and 0.30, particularly between 0.25 and 0.30. In fact, excessively low redoxes contribute to reducing the working life of furnaces.

In the first and even second sheet, the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Said first glass sheet can have a chemical composition that comprises the following constituents in a content varying within the limits by weight defined hereinafter:
  $SiO_2$ 60-75%
  $Al_2O_3$ 0-10%
  $B_2O_3$ 0-5%, preferably 0
  CaO 5-15%
  MgO 0-10%
  $Na_2O$ 5-20%
  $K_2O$ 0-10%
  BaO 0-5%, preferably 0,
  $SO_3$ 0.1-0.4%
  $Fe_2O_3$ (total iron) 0 to 0.015%,
  Redox 0.1-0.3.

Throughout the text, the percentages are percentages by weight.

The glass sheets are preferably formed by floating on a tin bath. Other types of forming methods can be used, such as drawing methods, down-draw method, lamination method, Fourcault method.

The glass composition of the first glass sheet can comprise, other than the inevitable impurities contained particularly in the raw materials, a small proportion (up to 1%) of other constituents, for example agents aiding in the melting or refining of the glass (Cl . . . ), or still elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any infrared absorbing agent (particularly for a wavelength comprised between 800 and 1,800 nm). In particular, the composition according to the invention preferably does not contain any of the following agents: oxides of transition elements such as CoO, CuO, $Cr_2O_3$, NiO, $MnO_2$, $V_2O_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

Preferably, the first glass sheet has a chemical composition that comprises the following constituents in an amount varying within the limits by weight as defined hereinafter:
$SiO_2$
$B_2O_3$ 0-5%, preferably 0
CaO 5-15%
MgO 0-10%
$Na_2O$ 5-20%
$K_2O$ 0-10%
BaO 0-5%, preferably 0,
$SO_3$ >0.2-0.4%
$Fe_2O_3$ (total iron) 0 to 0.015%,
Redox 0.2-0.30.

The first glass sheet can have a chemical composition that includes the following constituents in a content varying within the limits by weight as defined hereinafter:
$SiO_2$ 60-75%
$Al_2O_3$ 0-10%
$B_2O_3$ 0-5%, preferably 0
CaO 5-15%
MgO 0-10%
$Na_2O$ 5-20%
$K_2O$ 0-10%
BaO 0-5%, preferably 0,
$SO_3$ 0.1-0.4%
$Fe_2O_3$ (total iron) 0 to 0.02%,
Redox 0.15-0.3.

In the present invention, the $Fe_2O_3$ content (total iron) is preferably less than 0.015%, even less than or equal to 0.012%, particularly 0.010%, in order to increase the near infrared transmission of the glass. The $Fe_2O_3$ content is preferably greater than or equal to 0.005%, particularly 0.008% so that the cost of the glass is not a disadvantage.

The redox is preferably greater than or equal to 0.15, and particularly between 0.2 and 0.30, particularly between 0.25 and 0.30. In fact, excessively low redoxes contribute to reducing the working life of the furnaces.

In the first and second sheet, the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

FIG. 2 shows a schematic representation of a cross-sectional view of the glazing 201.

The glazing 201 comprises an internal free surface 2011 and an external free surface 2012 separated by a thickness that can vary locally, the internal free surface 2011 being located toward the interior of the vehicle and the external free surface 2012 toward the exterior of the vehicle. A light wave emitted by the LiDAR therefore passes first through the internal free surface 2011 then the external free surface 2012 of the glazing 201. For a given light wave, the point of the internal free surface 2011 through which the light wave passes is called point of impact.

FIG. 9 shows a schematic representation of a front view of an example of glazing 201. In FIG. 9, the glazing 201 is a road vehicle windshield.

Referring to FIG. 9, the windshield 201 comprises a sheet 11 of glass 11 and an opaque element 12. The opaque element 12 makes it possible in particular to hide from the exterior of the vehicle elements arranged in the interior of said vehicle, for example a portion of the LiDAR device. The opaque element 12 covers at least one of the main faces of the glass sheet 11 in such a way as to border the entire windshield 10. The opaque element 12 can be arranged on the surface of only one of the two main faces of the glass sheet 11 or it can comprise several portions, each portion being arranged on either face of the main faces of the glass sheet 11. In the case of a multiple glazing comprising several glass sheets, such as a laminated glazing as described previously, the opaque element 12 can also be formed from several portions, each portion being arranged on the surface of two or more glass sheets according to the number of portions. Moreover, the glass sheet 11 can be inclined for example at an angle of 30°. Furthermore, the glass sheet 11 can be curved along one or two axes, the radius of curvature being for example comprised between 6 m and 30 m.

Preferably, the opaque element 12 is an enamel layer deposited on the surface of the sheet 11. Naturally, the enamel layer can be replaced by any other opaque element that enables certain elements arranged in the interior of the road vehicle to be hidden from the exterior.

Furthermore, as can be seen in FIG. 1, the opaque element 12 defines a given zone 13 of the glass sheet 11 located at the upper border of the windshield 10, for example a peripheral central zone. The given zone 13, called LiDAR zone 13, is intended to be placed on the path of the waves of the LiDAR device. Preferably, the surface area of the given zone 13 is less than 0.5 $m^2$.

Because the glazing 201 has non-planarities, the path of the light waves emitted by the LiDAR passing through the LiDAR zone 13 of the glazing 201 is deviated. The angular corrections determined via the method according to the first aspect of the invention are intended to be used by the LiDAR to take into account the deviation that the glazing 201 causes to the light waves emitted by the LiDAR, in order to correctly assess the position of the objects.

FIG. 1 shows a schematic representation of a LiDAR 202 emitting a light wave passing through a vehicle glazing 201.

The glazing 201 is inclined at an angle θ relative to a horizontal plane P comprising a horizontal axis X and perpendicular to a vertical axis Y. The angle θ is for example comprised between 0° and 90° and preferably between 21° and 36° and on average 30° when the glazing 201 is a windshield.

The glazing 201 and in particular the internal free surface 2011, defines a surface plane comprising the horizontal axis X and a normal axis Y' perpendicular to the horizontal axis X. The vertical axis Y is not included in the surface plane.

In FIG. 1, the LiDAR 202 emits a light wave toward the glazing 201 at an angle of emission α. The diamond shown on the glazing 201 corresponds to the point of the glazing 201 through which a light wave would pass, emitted by the LiDAR 202 at a zero angle of emission α.

The angle of emission α comprises a horizontal component $α_h$ along the horizontal axis X and a vertical component $α_v$ along the vertical axis Y.

FIG. 6 is a block diagram showing the sequence of steps of the method 100 according to the first aspect of the invention.

The first step 101 of the method 100 consists, for each point of a set of points of the glazing 201, in determining a local thickness of the glazing 201 at said point.

"Local thickness of the glazing at a point" is understood as being the thickness between the internal free surface 2011 and the external free surface 2012 at said point.

FIG. 5 shows a schematic representation of the glazing 201 on which the points 2031 of the set of points 2031 are shown.

In FIG. 5, each point 2031 of the set of points 2031 is represented by a black circle.

The set of points 2031 is for example selected so as to cover a particular zone 2030 of the glazing 201.

The zone 2030 is for example rectangular, with a dimension along the horizontal axis X of at least 1 cm and a dimension along the normal axis Y' of at least 1 cm.

The set of points 2031 is for example selected in such a way that two points 2031 of the set of adjacent points 2031 are spaced by at least 100 μm along the horizontal axis X and/or at least 10 nm along the normal axis Y'.

The set of points 2031 can also be selected based on the type of defects commonly encountered in the glazing 201.

The first step 101 is carried out by a direct measurement of thickness at said point 2031, or by differentiation of a first surface measurement made on the internal free surface 2011 of the glazing 201 at said point 2031 and a second surface measurement made on the external free surface 2012 of the glazing 201 at said point 2031.

The first step 101 is for example carried out by wavefront measurement. A light wave emitter is used for this, comprising a wavefront analyzer, also called aberrometer, which allows measuring the shape of the wavefront of a light wave emitted by the emitter and determining the deformation undergone by the wavefront during the passage thereof through the glazing 201. It will be remembered that a wavefront is the wave surface in three dimensions defined in such a way that each light wave from the same light source is orthogonal to the wavefront.

Thus, the difference in phase between the transmitted wavefront, that is the wavefront of the light wave having passed through the glazing 201 and the wavefront of the emitted light wave is calculated to determine a wavefront error translating the deviation of the transmitted wavefront and making it possible to obtain the local thickness at the point of the glazing 201 through which the light wave passed.

The first step 101 can be carried out by other contactless optical measuring methods, for example by deflectometry or confocal profilometry. The first step 101 can also be carried out by optical transmission distortion measurement.

The second step 102 of the method 100, shown in FIG. 2, consists in calculating a horizontal local slope Eh corresponding to the component along the horizontal axis X of the difference c between the local thickness and the thickness e that the glazing 201 should have and a vertical local slope $\varepsilon_v$ corresponding to the component along the normal axis Y' of the difference between the local thickness and the thickness e that the glazing 201 should have at said point 2031.

The second step 102 is carried out by digital processing.

The third step 103 of the method 100 consists in calculating a vertical angular offset $\delta_v$ based on the vertical component $\alpha_v$ of the emission angle $\alpha$ of the light wave intended to pass through the glazing 201 at said point 2031, on the vertical local slope $\varepsilon_v$ at said point 2031 and on the inclination θ of the glazing 201.

The fourth step 104 of the method 100 consists in calculating a horizontal angular offset $\delta_h$ based on the horizontal component an of the emission angle $\alpha$ of the light wave intended to pass through the glazing 201 at said point 2031, on the horizontal local slope Eh at said point 2031 and on the inclination θ of the glazing 201.

FIG. 3 shows a schematic representation of the path of a light wave emitted by a LiDAR 202 through the glazing 201 in a plane perpendicular to the surface plane. Because the surface plane includes the horizontal axis to X, only the vertical components can be seen in FIG. 3.

In FIG. 3, the glazing 201 has a refractive index n. $\vec{s_1}$ corresponds to the direction of the light wave before it passes through the glazing 201, that is according to the emission angle $\alpha$, $\vec{s_2}$ in the direction of the light wave after it passes through the internal free surface 2011 of the glazing 201 and $\vec{s_3}$ in the direction of the light wave after it passes through the internal free surface 2011 then the external free surface 2012 of the glazing 201.

After it passes through the glazing 201, the light wave has been deviated by the angle $\delta_v$ along the vertical axis Y as shown in FIG. 3 and by an angle $\delta_h$ along the horizontal axis X not shown in the figures.

The third step 103 and the fourth step 104 are carried out on the one hand by applying the equation of refraction to the internal free surface 2011 of the glazing 201 and on the other hand, to the external free surface 2012 of the glazing 201. The following is obtained:

$$\begin{cases} \vec{s_2} = -\frac{1}{n}\vec{N_1} \wedge \left(\vec{N_1} \wedge \vec{s_1}\right) - \sqrt{1 - \frac{1}{n^2}\left\|\vec{N_1} \wedge \vec{s_1}\right\|^2}\,\vec{N_1} \\ \vec{s_3} = -n\vec{N_2} \wedge \left(\vec{N_2} \wedge \vec{s_2}\right) - \sqrt{1 - n^2\left\|\vec{N_2} \wedge \vec{s_2}\right\|^2}\,\vec{N_2} \end{cases} \quad (1)$$

With:

$\vec{N_1}$, the vector normal to the internal free surface 2011 of the glazing 201 at said point 2031;

$\vec{N_2}$, the vector normal to the external free surface 2012 of the glazing 201 at said point 2031.

By first-order approximation of the equation of refraction applied to the internal free surface 2011 of the glazing 201 and the equation of refraction applied to the external free surface 2012 of the glazing 201 developed at (1), we obtain:

$$\begin{cases} \delta_v = A_{vv}\varepsilon_v + A_{hv}\varepsilon_h \\ \delta_h = A_{vh}\varepsilon_v + A_{hh}\varepsilon_h \end{cases}$$

With $A_{vv}$, $A_{hv}$, $A_{vh}$, $A_{hh}$ coefficients dependent on the vertical component $\alpha_v$ of the angle of emission $\alpha$ and on the horizontal component $\alpha_h$ of the angle of emission $\alpha$ of the light wave intended to pass through the glazing 201 at said point 2031 and on the inclination θ of the glazing 201.

The coefficients $A_{vv}$, $A_{hv}$, $A_{vh}$, $A_{hh}$ are calculated by an analytical method, that is without having to resolve differential equations, using a matrix calculation tool such as NumPy or MATLAB.

For example, in the case of a non-inclined glazing 201, that is having an inclination angle of 0°, for a zero angle of emission $\alpha$, we obtain:

$$\begin{cases} A_{vv} = A_{hh} = n - 1 \\ A_{vh} = A_{hv} = 0 \end{cases}$$

For example, in the case of an inclined glazing 201, that is having an inclination angle θ, for a zero angle of emission α we obtain:

$$\begin{cases} A_{vv} = \dfrac{\sqrt{n^2 - \sin^2\theta} - \cos\theta}{\cos\theta} \\ A_{hh} = \sqrt{n^2 - \sin^2\theta} - \cos\theta \\ A_{vh} = A_{hv} = 0 \end{cases}$$

FIG. 4 gives the value of coefficients $A_{vv}$, $A_{hv}$, $A_{vh}$, $A_{hh}$ based on the vertical component $\alpha_v$ of the angle of emission α and on the horizontal component an of the angle of emission α for a glazing 201 inclined at 30° relative to the horizontal axis X.

The fifth step 105 of the method 100 consists in establishing an angular correction map. For each point 2031 of the set of points 2031, the angular correction map comprises the vertical angular offset $\delta_v$ and the horizontal angular offset $\delta_h$ calculated in the third step 103 and fourth step 104 of the method 100 for said point 2031.

The method 100 can also comprise an additional step 1051 consisting in supplementing the angular correction map by calculating the vertical angular offset $\delta_v$ and the horizontal angular offset $\delta_h$ of several points of the glazing 201 not belonging to the set of points 2031. For example, the calculation is carried out by calculating for each of these points, a horizontal local slope Eh and a vertical local slope $\varepsilon_v$ by interpolation from horizontal local slopes (Eh) and vertical local slopes ($\varepsilon_v$) calculated for the set of points 2031, then by calculating a vertical angular offset $\delta_v$ and a horizontal angular offset $\delta_h$ for the point as done in the third step 103 and in the fourth step 104 of the method 100.

This step 1051 is particularly pertinent when the set of points 2031 do not coincide with the set of points of impact of the LiDAR 202 in order to be able to correct the estimates of the LiDAR 202 at each point of impact 2032.

FIG. 7 shows an exemplary set of points of impact 2032 of the LiDAR 202. If the angular correction map has been established for the set of points 2031 shown in FIG. 5, the points of impact 2032 do not coincide with the set of points 2031.

The relationship between the position of one point on the glazing 201 and in particular its coordinates (x; y') respectively along the horizontal axis X and the normal axis Y', and the angle of emission α can be expressed as follows:

$$\begin{cases} x = \dfrac{\cos\theta\tan\alpha_h}{\sin\theta\tan\alpha_v + \cos\theta} \\ y' = \dfrac{\sin\alpha_v}{\cos(\theta - \alpha_v)} \end{cases}$$

The first step 101, second step 102, third step 103, fourth step 104 and fifth step 105 and completion step 1051 can be carried out prior to the installation of the LiDAR 202. In this case, a theoretical reference point of impact is defined. The theoretical reference point of impact is associated with an angle of emission α of reference $\alpha_{ref}$. The reference angle of emission $\alpha_{ref}$ is preferably equal to 0.

The method 100 comprises for example a step 1060 of forming a referencing point on the internal free surface 2011 in the form of a mark corresponding to the defined theoretical reference point of impact.

FIG. 8 shows a schematic representation of a glazing 201 on which the referencing point $O_{ref}$ is marked by a black cross.

If, after installation of the LiDAR 202 there is an offset between the referencing point $O_{ref}$ and a real reference point of impact $O_{LIDAR}$ corresponding to the point of impact 2032 on the internal free surface 2011 of a light wave emitted at the reference emission angle $\alpha_{ref}$ by the LiDAR 202, the method 100 comprises either a step 1061 of alignment of the real reference point of impact $O_{LiDAR}$ and the referencing point $O_{ref}$, or a step 1062 of recalibration of the angular correction map by applying a translation v to each point of the angular correction map.

As shown in FIG. 8, the translation v for example has a value equal to the difference between the position of the referencing point $O_{ref}$ and the position of the reference point of impact $O_{LiDAR}$ on the internal free surface 2011 of the glazing 201 represented by a white cross.

The alignment step 1061 is for example carried out via a mechanism for attaching the LiDAR 202 onto the vehicle.

The step 1060 of forming the reference point can be carried out any time prior to the alignment step 1061 or the alignment step 1062.

A second aspect of the invention relates to a vehicle glazing 201 capable of allowing the passage of light waves emitted by a LiDAR 202.

The glazing 201 comprises a storage means 2014 shown in FIG. 1. The storage means 2014 is configured to store the angular correction map established during the fifth step 105 via the method 100 according to the first aspect of the invention, optionally completed during completion step 1051.

The storage means 2014 can also store other information relative to the glazing 201, for example the composition, date of manufacture or angle of inclination θ thereof, or information related to the vehicle such as the vehicle model.

The storage means 2014 is for example in the form of a datamatrix. The storage means 2014 can also be in the form of a barcode, for example a flash code, a TAGs, a QR code which links to a database. Naturally, the storage means 2014 can be in another form, such as a hard disk, a storage server or an electronic memory.

The data stored in the storage means 2014 can be encrypted using any known appropriate encryption algorithm. A specific reader can then be used to unlock the storage means 2014 and access at least a portion of the data it contains.

The storage means 2014 can be on the glazing 201 and in particular printed on the glazing 201. The printing is for example carried out by etching and/or by inkjet printing.

The storage means 2014 is for example transparent or visible under certain conditions, for example only at a certain angle, for reasons of discretion and is located on clear glass as shown in FIG. 1.

The storage means 2014 is for example in a masking made in the zone of the glazing 201 covered by the opaque element 12, as shown in FIG. 9.

A third aspect of the invention relates to a system associating a glazing 201 according to the second aspect of the invention and a LiDAR 202 configured to emit light waves passing through the glazing 201.

The glazing 201 can then comprise a referencing point $O_{ref}$ in the form of a marking, for example on the internal free surface 2011 thereof. The marking can be permanent (deposit, encore, enamel, screenprinted point, etc.) or temporary, for example a sticker) that is removable after the alignment step 1061.

A fourth aspect of the invention relates to a vehicle comprising a glazing 201 according to the second aspect of the invention or a system according to the third aspect of the invention.

The invention claimed is:

1. A method for analyzing a glazing of a vehicle for a correction intended to be used for a LiDAR configured to emit light waves, the glazing comprising an internal free surface toward an interior of the vehicle and an external free surface toward an exterior of the vehicle, each light wave being intended to pass through the glazing and being defined by a point of impact on the internal free surface, the internal free surface defining a surface plane having an inclination relative to a horizontal plane having a horizontal axis, the horizontal axis being perpendicular to a vertical axis and to a normal axis included in the surface plane, the method comprising:

for each point of a set of points of the glazing:
determining a local thickness of the glazing at said point;
obtaining by digital processing, a horizontal local slope and a vertical local slope at said point, from the local thickness at said point;
calculating a vertical angular offset based on a vertical component of an emission angle of the light wave intended to pass through the glazing at said point, of the vertical local slope at said point and of the inclination of the glazing;
calculating a horizontal angular offset based on a horizontal component of the emission angle of the light wave intended to pass through the glazing at said point, of the horizontal local slope at said point and of the inclination of the glazing, and establishing an angular correction map comprising, for each point of the set of points, the vertical angular offset and the horizontal angular offset calculated for said point.

2. The method according to claim 1, further comprising a step of completion of the angular correction map by calculating the vertical angular offset and the horizontal angular offset of a plurality of points of the glazing not belonging to the set of points, the calculation being carried out from horizontal local slopes and vertical local slopes obtained by interpolation from horizontal local slopes and vertical local slopes calculated for the set of points.

3. The method according to claim 1, wherein each point of the set of points is spaced from another point of the set of points by no more than 1 mm or 100 µm along the horizontal axis and/or no more than 100 nm or 10 nm along the normal axis.

4. The method according to claim 1, wherein the set of points is selected so as to cover a zone included in the glazing, having a dimension along the horizontal axis of at least 1 cm and a dimension along the normal axis of at least 1 cm.

5. The method according to claim 1, wherein determining the local thickness is carried out by a direct measurement of thickness or by differentiation of a first surface measurement carried out on the internal free surface of the glazing and a second surface measurement carried out on the external free surface of the glazing.

6. The method according to claim 5, wherein determining the local thickness is carried out by contactless optical measurement.

7. The method according to claim 6, wherein determining the local thickness is carried out by wavefront measurement, deflectometry or confocal profilometry.

8. The method according to claim 5, wherein determining the local thickness is carried out by optical transmission distortion measurement.

9. The method according to claim 1, wherein the vertical angular offset and the horizontal angular offset are calculated by the following formulas:

$$\begin{cases} \delta_v = A_{vv}\varepsilon_v + A_{hv}\varepsilon_h \\ \delta_h = A_{vh}\varepsilon_v + A_{hh}\varepsilon_h \end{cases}$$

with $A_{vv}$, $A_{hv}$, $A_{vh}$, $A_{hh}$, coefficients dependent on the vertical component and on the horizontal component of the angle of emission of the light wave intended to pass through the glazing at said point and on the inclination of the glazing.

10. The method according to claim 9, wherein the coefficients $A_{vv}$, $A_{hv}$, $A_{vh}$, $A_{hh}$ are calculated by an analytical method.

11. The method according to claim 1, wherein determining the local thickness, obtaining horizontal and vertical local slopes, calculating a vertical angular offset, calculating a horizontal angular offset and establishing an angular correction map and optionally completing the angular correction map are carried out prior to installation of the LiDAR by defining a theoretical reference point of impact associated with a reference angle of emission.

12. The method according to claim 11, further comprising forming a referencing point on the internal free surface of the glazing in the form of a mark corresponding to the theoretical reference point of impact.

13. The method according to claim 12, wherein, if, after installation of the LiDAR, there is an offset between the referencing point and a real reference point of impact of a light wave emitted at the reference angle of emission by the LiDAR, the method comprises aligning the real reference point of impact and the referencing point.

14. The method according to claim 13, wherein the aligning is carried out by a mechanism of attaching the LiDAR onto the vehicle.

15. The method according to claim 12, wherein if, after installation of the LiDAR, there is an offset between the referencing point and a real reference point of impact of a light wave emitted at the reference angle of emission by the LiDAR, the method comprises recalibrating the angular correction map by application of a translation.

16. The method according to claim 15, wherein the translation has a value equal to the difference between the position of the referencing point and the position of the real reference point of impact on the internal free surface of the glazing.

17. A vehicle glazing capable of allowing passage of light waves emitted by a LiDAR, the glazing comprising a storage system configured to store an angular correction map established via the method according to claim 1 for the glazing.

18. The glazing according to claim 17, wherein the storage system is a datamatrix or a barcode that links to a database.

19. The glazing according to claim 17, wherein the storage system is is on the glazing.

20. The glazing according to claim 19, wherein the storage system is transparent or visible under certain conditions in clear view, and/or the glazing comprises a zone covered by an opaque element and the storage system is in a masking produced in the covered zone of the opaque element.

21. The glazing according to claim 17, wherein the glazing is a laminated glazing comprising an external glass, a lamination interlayer and an internal glass.

22. The glazing according to claim 21, further comprising at least one through-hole in the internal glass.

23. A system comprising a glazing according to claim 17 and a LiDAR configured to emit light waves passing through the glazing.

24. The system according to claim 23, wherein the glazing comprises a referencing point in the form of a marking.

25. A vehicle comprising a glazing according to claim 17.

26. A vehicle according to claim 25, comprising the glazing for windshield.

* * * * *